US012636996B2

(12) United States Patent
Sung

(10) Patent No.: US 12,636,996 B2
(45) Date of Patent: May 26, 2026

(54) VARIABLE LAMP SYSTEM FOR MOVING VEHICLES CAPABLE OF CONTROLLING BRIGHTNESS AND IRRADIATION ANGLE AND MOVING VEHICLE INCLUDING THE SAME

(71) Applicant: HYUNDAI MOBIS CO., LTD., Seoul (KR)

(72) Inventor: Jun Young Sung, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 78 days.

(21) Appl. No.: 18/783,671

(22) Filed: Jul. 25, 2024

(65) Prior Publication Data

US 2025/0128657 A1 Apr. 24, 2025

(30) Foreign Application Priority Data

Oct. 24, 2023 (KR) ........................ 10-2023-0142540
Nov. 2, 2023 (KR) ........................ 10-2023-0150023

(51) Int. Cl.
*B60Q 1/14* (2006.01)
*H05B 47/10* (2020.01)

(52) U.S. Cl.
CPC ........... *B60Q 1/1423* (2013.01); *H05B 47/10* (2020.01); *B60Q 2300/112* (2013.01); *B60Q 2300/114* (2013.01); *B60Q 2300/314* (2013.01); *B60Q 2300/322* (2013.01)

(58) Field of Classification Search
CPC ........... B60Q 1/1423; B60Q 2300/112; B60Q 2300/114; B60Q 2300/314; B60Q 2300/322; B60Q 2300/332; B60Q 2300/333; B60Q 2300/334; B60Q 1/085; B60Q 1/143; H05B 47/10; H05B 47/105
See application file for complete search history.

(56) References Cited

U.S. PATENT DOCUMENTS

2023/0306753 A1* 9/2023 Kinoshita .............. B60Q 1/085
2024/0109475 A1* 4/2024 Hachisuka ............. G06V 20/58

* cited by examiner

*Primary Examiner* — Renan Luque
(74) *Attorney, Agent, or Firm* — Morgan, Lewis & Bockius LLP

(57) ABSTRACT

Provided are a variable lamp system for moving vehicles capable of controlling lighting brightness and irradiation angle by using speed information of the moving vehicle and surrounding road information of the moving vehicle, and a moving vehicle including the same.

19 Claims, 4 Drawing Sheets

[FIG. 1]
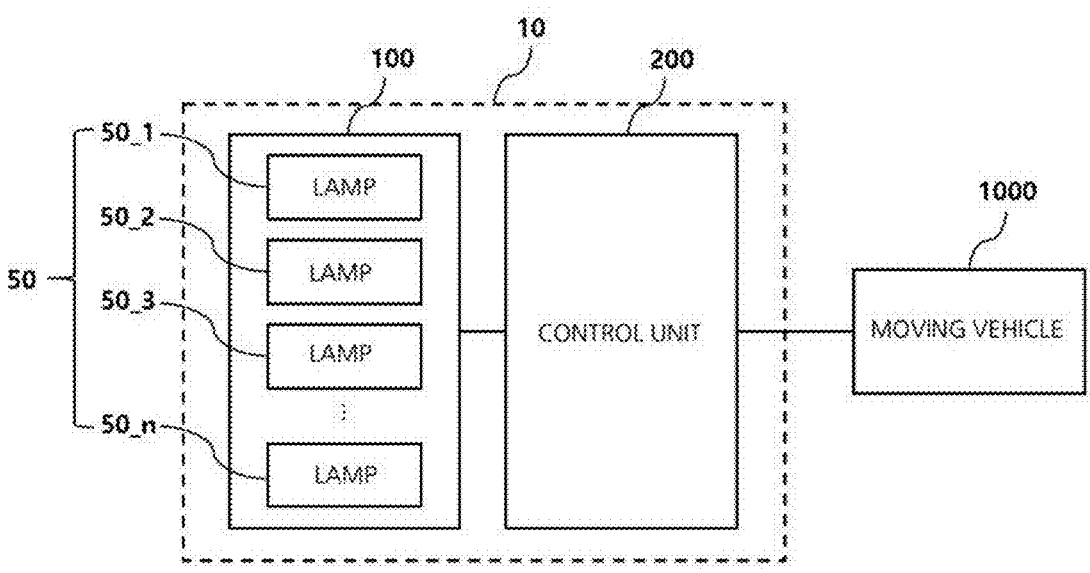

[FIG. 2]
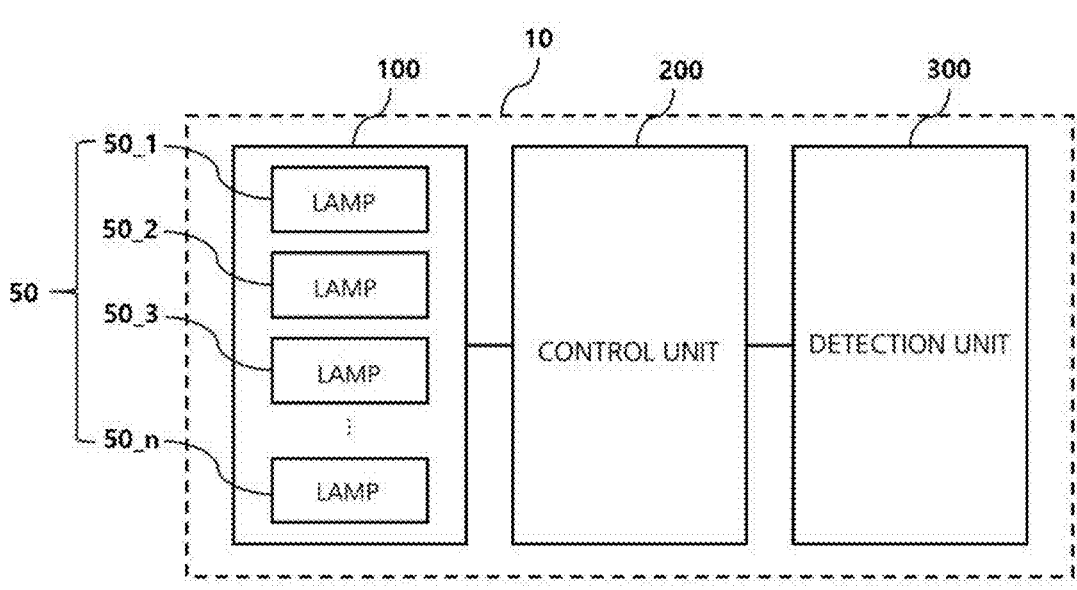

[FIG. 3]
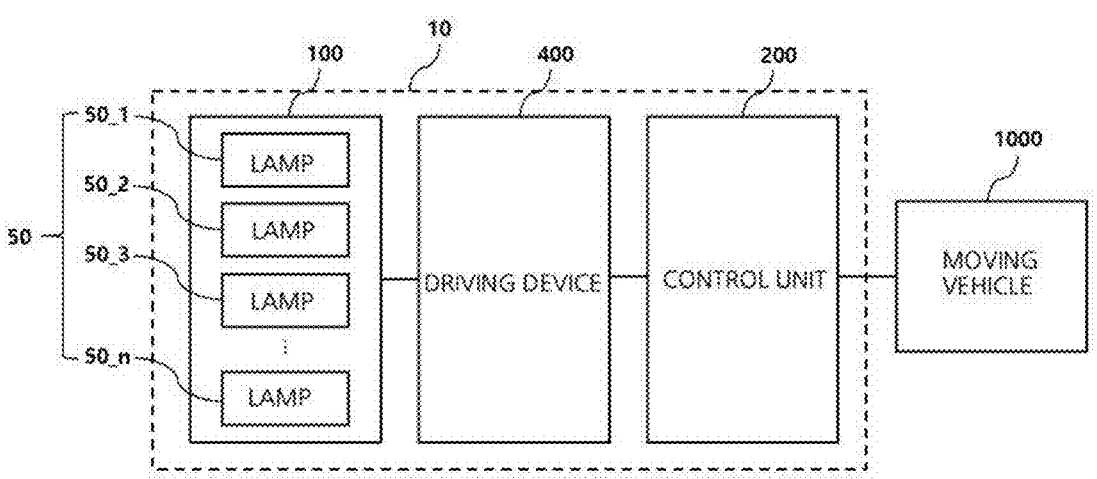

[FIG. 4]
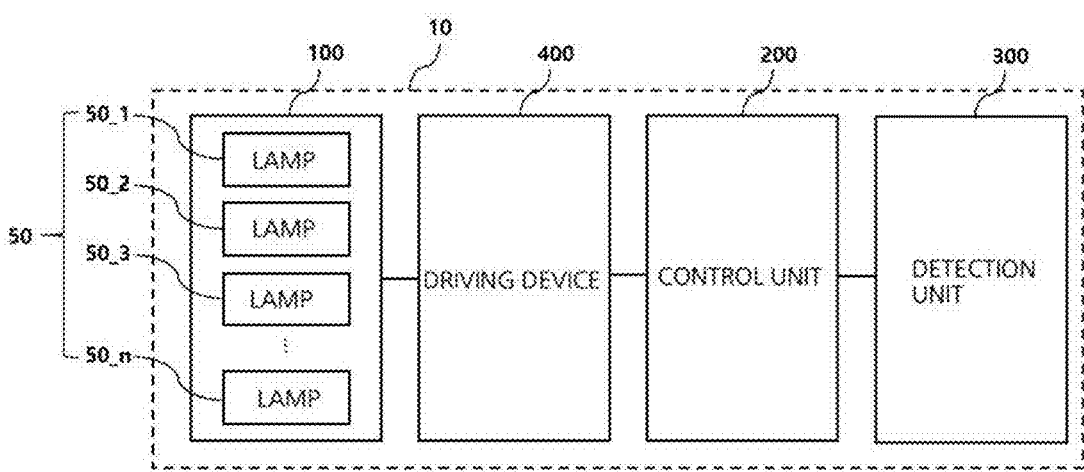

VARIABLE LAMP SYSTEM FOR MOVING VEHICLES CAPABLE OF CONTROLLING BRIGHTNESS AND IRRADIATION ANGLE AND MOVING VEHICLE INCLUDING THE SAME

CROSS-REFERENCE TO RELATED APPLICATIONS

This application claims priority under 35 U.S.C. § 119 to Korean Patent Application No. 10-2023-0142540, filed on Oct. 24, 2023, and No. 10-2023-0150023, filed on Nov. 2, 2023, in the Korean Intellectual Property Office, the disclosure of which is incorporated herein by reference in its entirety.

TECHNICAL FIELD

The following disclosure relates to a variable lamp system for moving vehicles capable of controlling brightness and irradiation angle and a moving vehicle including the same, and more particularly, to a variable lamp system for moving vehicles capable of controlling lighting brightness and irradiation angle by using speed information of the moving vehicle and surrounding road information of the moving vehicle, and a moving vehicle including the same.

BACKGROUND

In general, a vehicle may include a lighting device for a vehicle driver to clearly see an object in a travel direction when traveling at night, and to inform another vehicle or a pedestrian of a travel state of the driver's vehicle.

A head lamp, also referred to as a head light, may be a lighting lamp illuminating a front path to which the vehicle is moved, and may require brightness enabling the driver to check an obstacle on a road that is located at a distance of 100 m in front of the vehicle at night. A different head lamp standard is set for each country, and in particular, a different irradiation direction of a head lamp beam is set based on whether the driver drives the vehicle on the left or right.

The head lamp for a vehicle may be generally used for a lighting function for the driver to see a target object and for an indicating, signaling, or warning function to inform another vehicle or another road user of the travel state of the driver's own vehicle.

A conventional head lamp for a vehicle has been introduced in an attempt to provide the driver with advantageous visibility because the head lamp may automatically adjust the irradiation direction based on the travel state such as a road environment or a vehicle state. For example, an irradiation angle of the head lamp may be adjusted based on a steering wheel operation direction of the vehicle, that is, the head lamp may be adjusted to radiate lighting in a right direction when the vehicle turns right, and adjusted to radiate the lighting in a left direction when the vehicle turns left.

However, the conventional vehicle head lamp may be controlled based on the steering wheel direction without considering the road environment (e.g., road curvature or brightness) or a vehicle speed, and may thus fail to illuminate a blind spot or cause a glare by radiating the lighting to another driver or a pedestrian.

In addition, quite a few traveling accidents occur every year due to improper use of a high beam while people's interest in a vehicle travel safety is increasing, and a vehicle lamp module having an adaptive driving beam (ADB)

function may resolve a contradiction that occurs when using high-low beams to some extent. That is, the vehicle lamp module having the ADB function may provide excellent visibility to the vehicle driver, and may prevent the glare from a driver of another vehicle. The ADB function may have a sort of smart control performance, and the vehicle lamp module having the ADB function may control a lighting zone and lighting brightness in real time by independently controlling each LED, thus effectively preventing the glare from another vehicle and the pedestrian.

A conventional vehicle having the ADB function has been used in such a way that the driver directly specifies a speed at which the ADB function is activated, and the ADB function is automatically activated when the vehicle travels at this speed or more. However, according to this conventional method, the lighting may be controlled without considering the road environment on which the vehicle is traveling. Therefore, the light may become darker on a relatively dark road, or may become brighter on a relatively bright place, thereby obstructing a view of the pedestrian or another driver.

In addition, even though the vehicle includes the ADB function, there are frequent cases where the driver is unaware of this fact and incapable of using the ADB function. Therefore, there is a need for a method of automatically activating the ADB function based on the surrounding road environment and the vehicle speed.

SUMMARY

An embodiment of the present invention is directed to providing a lighting device which may automatically control its irradiation angle and brightness by using speed information of a moving vehicle and surrounding road information of the moving vehicle.

In one general aspect, provided is a variable lamp system for moving vehicles, which is variable based on a surrounding road state, the system including: a lighting device including at least one lamp; and a control unit controlling the lighting device, wherein the control unit controls brightness of the lighting device based on speed information of the moving vehicle and surrounding road information of the moving vehicle.

When a movement speed of the moving vehicle is classified into first to third critical speeds, the first critical speed being greater than the second critical speed, and the second critical speed being greater than the third critical speed, the control unit may receive the speed information of the moving vehicle and the surrounding road information of the moving vehicle from the moving vehicle to control the brightness of the lighting device based on the speed information of the moving vehicle and the surrounding road information of the moving vehicle, classify a driver tendency as a first tendency in response to determining that acceleration and deceleration information of the moving vehicle, included in the speed information of the moving vehicle, is the same as pre-stored acceleration and deceleration information, classify the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classify the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and control the brightness of the lighting device based on the first to third tendencies and the first to third critical speeds.

When a first road is a highway, and a second road is not the highway but a general road brighter than a predetermined brightness standard, the control unit may operate an adaptive driving beam (ADB) mode to control the brightness of the lighting device in response to determining that a speed of the moving vehicle is the first critical speed or more in a case where a road is the first road or the second road and the driver tendency is the second tendency, or the road is the first road and the driver tendency is the first tendency.

When the first road is a highway, the second road is not the highway but a general road brighter than a predetermined brightness standard, and a third road is not highway but a general road darker than the predetermined brightness standard, the control unit may operate an adaptive driving beam (ADB) mode to control the brightness of the lighting device in response to determining that a speed of the moving vehicle is the second critical speed or more in a case where the road is the first road and the driver tendency is the second tendency, the road is the second road and the driver tendency is the first tendency, or the road is the third road and the driver tendency is the third tendency.

When the second road is not a highway but a general road brighter than a predetermined brightness standard, and a third road is not the highway but a general road darker than the predetermined brightness standard, the control unit may operate an adaptive driving beam (ADB) mode to control the brightness of the lighting device in response to determining that a speed of the moving vehicle is the third critical speed or more in a case where the road is the second road or the third road and the driver tendency is the third tendency, or the road is the third road and the driver tendency is the first tendency.

The system may further include a detection unit providing the speed information of the moving vehicle and the surrounding road information of the moving vehicle, wherein the control unit controls the brightness of the lighting device based on the speed information of the moving vehicle and the surrounding road information of the moving vehicle, provided by the detection unit, classifies a driver tendency as a first tendency in response to determining that acceleration and deceleration information of the moving vehicle, included in the speed information of the moving vehicle, is the same as pre-stored acceleration and deceleration information, classifies the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classifies the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and controls the brightness of the lighting device based on the first to third tendencies.

When a first road is a highway, and a second road is not the highway but a general road brighter than a predetermined brightness standard, the control unit may operate an adaptive driving beam (ADB) mode to control the brightness of the lighting device in response to determining that a speed of the moving vehicle that is detected by the detection unit is the first critical speed or more in a case where the road is the first road or the second road and the driver tendency is the second tendency, or the road is the first road and the driver tendency is the first tendency.

When the first road is a highway, the second road is not the highway but a general road brighter than a predetermined brightness standard, and a third road is not the highway but a general road darker than the predetermined brightness standard, the control unit may operate an adaptive driving beam (ADB) mode to control the brightness of the lighting device in response to determining that a speed of the moving vehicle that is detected by the detection unit is the second critical speed or more in a case where the road is the first road and the driver tendency is the second tendency, the road is the second road and the driver tendency is the first tendency, or the road is the third road and the driver tendency is the third tendency.

When the second road is not a highway but a general road brighter than a predetermined brightness standard, and a third road is not the highway but a general road darker than the predetermined brightness standard, the control unit may operate an adaptive driving beam (ADB) mode to control the brightness of the lighting device in response to determining that a speed of the moving vehicle that is detected by the detection unit is the third critical speed or more in a case where the road is the second road or the third road and the driver tendency is the third tendency, or the road is the third road and the driver tendency is the first tendency.

In another general aspect, provided is a variable lamp system for moving vehicles, which is variable based on a surrounding road state, the system including: a lighting device including at least one lamp; and a driving device connected to the lamp to adjust an irradiation angle of the lighting device; and a control unit controlling the driving device, wherein the control unit controls the driving device based on speed information of the moving vehicle and surrounding road information of the moving vehicle.

The control unit may receive the speed information of the moving vehicle and the surrounding road information of the moving vehicle from the moving vehicle to control the driving device based on the speed information of the moving vehicle and the surrounding road information of the moving vehicle, classify a driver tendency as a first tendency in response to determining that acceleration and deceleration information of the moving vehicle, included in the speed information of the moving vehicle, is the same as pre-stored acceleration and deceleration information, classify the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classify the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and control the driving device based on the first to third tendencies.

When first to third modes are classified based on the irradiation angle of the lighting device, a rotation radius of the lighting device in the first mode being larger than in the second mode, and a rotation radius of the lighting device in the second mode being larger than the third mode, the control unit may control the driving device in the first to third modes for the lighting device to radiate the lighting in a rotation direction of the moving vehicle based on the speed information of the moving vehicle and the surrounding road information of the moving vehicle.

When the surrounding road information of the moving vehicle includes first to third road information based on a speed limit of a road, a first road having a higher speed limit than a second road, and the second road having a higher speed limit than a third road, the control unit may control the driving device in the first mode in a case where the road is the first road and has a curvature of 710 radius R to 90 R, and the driver tendency is the first tendency, the road is the second road and has a curvature of 380 R to 30 R, and the driver tendency is the first tendency, or the road is the third road and has a curvature of 140 R to 15 R, and the driver tendency is the second tendency.

The control unit may control the driving device in the second mode in a case where the road is the first road and has the curvature of 710 radius R to 90 R, and the driver tendency is the third tendency, the road is the second road and has the curvature of 380 R to 30 R, and the driver tendency is the second tendency, or the road is the third road and has the curvature of 140 R to 15 R, and the driver tendency is the first tendency.

The control unit may control the driving device in the third mode in a case where the road is the first road and has the curvature of 710 radius R to 90 R, and the driver tendency is the second tendency, the road is the second road and has the curvature of 380 R to 30 R, and the driver tendency is the third tendency, or the road is the third road and has the curvature of 140 R to 15 R, and the driver tendency is the third tendency.

The system may further include a detection unit providing the speed information of the moving vehicle and the surrounding road information of the moving vehicle, wherein the control unit controls the driving device based on the speed information of the moving vehicle and the surrounding road information of the moving vehicle, provided by the detection unit, classifies a driver tendency as a first tendency in response to determining that acceleration and deceleration information of the moving vehicle, included in the speed information of the moving vehicle, is the same as pre-stored acceleration and deceleration information, classifies the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classifies the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and controls the driving device based on the first to third tendencies.

When the surrounding road information of the moving vehicle includes first to third road information based on a speed limit of a road, a first road having a higher speed limit than a second road, and the second road having a higher speed limit than a third road, and first to third modes are classified based on the irradiation angle of the lighting device, a rotation radius of the lighting device in the first mode being larger than in the second mode, and a rotation radius of the lighting device in the second mode being larger than the third mode, the control unit may control the driving device in the first mode in a case where the road is the first road and has a curvature of 710 radius R to 90 R, and the driver tendency is the first tendency, the road is the second road and has a curvature of 380 R to 30 R, and the driver tendency is the first tendency, or the road is the third road and has a curvature of 140 R to 15 R, and the driver tendency is the second tendency.

The control unit may control the driving device in the second mode in a case where the road is the first road and has the curvature of 710 radius R to 90 R, and the driver tendency is the third tendency, the road is the second road and has the curvature of 380 R to 30 R, and the driver tendency is the second tendency, or the road is the third road and has the curvature of 140 R to 15 R, and the driver tendency is the first tendency.

The control unit may control the driving device in the third mode in a case where the road is the first road and has the curvature of 710 radius R to 90 R, and the driver tendency is the second tendency, the road is the second road and has the curvature of 380 R to 30 R, and the driver tendency is the third tendency, or the road is the third road and has the curvature of 140 R to 15 R, and the driver tendency is the third tendency.

Other features and aspects will be apparent from the following detailed description, the drawings, and the claims.

BRIEF DESCRIPTION OF THE DRAWINGS

FIG. 1 is a configuration diagram showing a variable lamp system for moving vehicles capable of adjusting brightness according to an embodiment of the present invention.

FIG. 2 is a configuration diagram showing a variable lamp system for moving vehicles capable of adjusting brightness that includes a detection unit according to an embodiment of the present invention.

FIG. 3 is a configuration diagram showing a variable lamp system for moving vehicles capable of adjusting an irradiation angle according to an embodiment of the present invention.

FIG. 4 is a configuration diagram showing a variable lamp system for moving vehicles capable of adjusting the irradiation angle that includes the detection unit according to an embodiment of the present invention.

DETAILED DESCRIPTION OF EMBODIMENTS

The above-mentioned purposes, features, and advantages will become more obvious from the following embodiments provided with reference to the accompanying drawings. The following descriptions of specific structures and functions are provided only to describe the embodiments based on a concept of the present invention. Therefore, the embodiments of the present invention may be implemented in various forms, and the present invention is not limited thereto. The embodiments of the present invention may be variously modified and may have several forms, and specific embodiments are thus shown in the accompanying drawings and described in detail in the specification or the present application. However, it is to be understood that the present invention is not limited to the specific embodiments, and includes all modifications, equivalents, and substitutions, included in the spirit and scope of the present invention. Terms such as "first", "second", or the like may be used to describe various components, and the components are not to be construed as being limited to the terms. The terms are used only to distinguish one component from another component. For example, a "first" component may be named a "second" component and the "second" component may also be named the "first" component, without departing from the scope of the present invention. It is to be understood that when one component is referred to as being "connected to" or "coupled to" another component, the corresponding component may be connected or coupled directly to another component or connected or coupled to another component with a third component interposed therebetween. On the other hand, it is to be understood that when one component is referred to as being "connected directly to" or "coupled directly to" another component, it may be connected to or coupled to another component without the other component interposed therebetween. Other expressions to describe a relationship between the components, i.e., "~between" and "directly between" or "adjacent to" and "directly adjacent to", should be interpreted in the same manner as above. Terms used in the specification are used only to describe the specific embodiments rather than limit the present invention. A term of a singular number used herein is intended to include its plural number unless explicitly indicated otherwise. It should be understood that terms "include" or "have" used in this specification specify the presence of features, numerals, steps, operations, components, parts mentioned in the specification, or combinations thereof, and do not preclude the presence or addition of one or more other features, numerals, steps, operations, components, parts or combinations thereof. Unless defined otherwise, it is to be understood that all the terms including technical and scientific terms, used herein, have the same meanings as those that are generally understood by those skilled in the art to which the present invention pertains. It should be interpreted that terms defined by a generally used dictionary have the same meanings as the meanings in the context of the related art, and these terms should not be ideally or excessively formally interpreted unless explicitly defined in the specification. Hereinafter, the present invention will be described in detail by describing the embodiments of the present invention with reference to the accompanying drawings. Like reference numerals proposed in each drawing denote like components.

FIG. 1 is a configuration diagram showing a variable lamp system for moving vehicles capable of adjusting brightness according to an embodiment of the present invention.

Referring to FIG. 1, a variable lamp system 10 for moving vehicles according to an embodiment of the present invention may include a lighting device 100 and a control unit 200. In addition, the variable lamp system 10 for moving vehicles may be connected to a moving vehicle 1000 in a wireless or wired manner, and receive, from the moving vehicle 1000, data such as speed information of the moving vehicle or surrounding road information of the moving vehicle.

The lighting device 100 may include at least one light emitting diode (LED) lamp 50. The number of LED lamps 50 included in the lighting device 100 may be determined by specifications of the lamp system 10 or specifications of the moving vehicle mounted with the lamp system 10. The lighting device 100 may control radiated lighting brightness by turning on/off each of the plurality of LED lamps 50.

The control unit 200 of the lamp system 10 according to an exemplary embodiment of the present disclosure may be a processor (e.g., computer, microprocessor, CPU, ASIC, circuitry, logic circuits, etc.). The control unit 200 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The control unit 200 may receive the speed information of the moving vehicle 1000 and the surrounding road information of the moving vehicle 1000 from the moving vehicle 1000 to control the lighting device 100 based on the speed information of the moving vehicle 1000 and the surrounding road information of the moving vehicle 1000. The control unit 200 may control the brightness of the lighting device 100 by controlling the plurality of lamps 50 included in the lighting device 100.

In addition, the control unit 200 may store acceleration and deceleration information of the moving vehicle 1000, included in the speed information of the moving vehicle 1000, and determine a driver tendency based on the acceleration and deceleration information of the moving vehicle 1000. For example, the control unit 200 may classify the driver tendency as a first tendency (or a standard driver) if the following information are the same as each other by comparing pre-stored reference acceleration and deceleration information with the acceleration and deceleration information of the moving vehicle 1000 that is received from the moving vehicle 1000, classify the driver tendency as a second tendency (or a cautious driver) if the information of the moving vehicle 1000 is determined to have a large change (for example, if the change is larger than a preset change) from the pre-stored reference acceleration and deceleration information by comparing the pre-stored reference acceleration and deceleration information with the acceleration and deceleration information of the moving vehicle 1000, and classify the driver tendency as a third tendency (or a safe driver) if the information of the moving vehicle 1000 is determined to have a small change (for example, the change is smaller than the preset change but larger than zero) from the pre-stored reference acceleration and deceleration information by comparing the pre-stored reference acceleration and deceleration information with the acceleration and deceleration information of the moving vehicle 1000.

The control unit 200 may control the brightness of the lighting device 100 based on the speed information of the moving vehicle 1000, the surrounding road information of the moving vehicle 1000, and driver information corresponding to the first to third tendencies. The control unit 200 may operate an adaptive driving beam (ADB) mode to control the brightness of the lighting device 100 if a speed of the moving vehicle 1000 is a first critical speed (for example, 60 km/h or more) in a case where a road on which the moving vehicle 1000 travels is a highway (hereinafter, a first road) or a road that is not the highway but is a road brighter than a predetermined brightness standard (for example, a downtown area) (hereinafter, a second road), and the driver tendency is the second tendency.

In addition, the control unit 200 may operate the adaptive driving beam (ADB) mode to control the brightness of the lighting device 100 if the speed of the moving vehicle 1000 is the first critical speed (for example, 60 km/h or more) in a case where the road on which the moving vehicle 1000 travels is the first road and the driver tendency is the first tendency.

In addition, the control unit 200 may operate the adaptive driving beam (ADB) mode to control the brightness of the lighting device 100 if the speed of the moving vehicle 1000 is a second critical speed (for example, 40 km/h or more) in at least one of cases where the road on which the moving vehicle 1000 travels is the first road and the driver tendency is the second tendency, the road is the second road and the driver tendency is the first tendency, and the road is not the highway but is a road darker than the predetermined brightness standard (for example, a country road) (hereinafter, a third road), and the driver tendency is the third tendency.

In addition, the control unit 200 may operate the adaptive driving beam (ADB) mode to control the brightness of the lighting device 100 if the speed of the moving vehicle 1000 is a third critical speed (for example, 20 km/h or more) in at least one of cases where the road on which the moving vehicle 1000 travels is the second or third road and the driver tendency is the third tendency, and the road on which 1000 travels is the third road and the driver tendency is the first tendency.

[Table 1] shows a speed condition of the moving vehicle 1000 in which the control unit 200 operates the adaptive driving beam (ADB) mode to control the brightness of the lighting device 100. The speed condition specified in [Table 1] is an embodiment of the present invention, and may be changed based on the specifications or the like of the moving vehicle.

TABLE 1

|  | First tendency | Second tendency | Third tendency |
|---|---|---|---|
| First road | 60 km/h or more | 60 km/h or more | 40 km/h or more |
| Second road | 40 km/h or more | 60 km/h or more | 20 km/h or more |
| Third road | 20 km/h or more | 40 km/h or more | 20 km/h or more |

The control unit 200 may determine a road condition and a driver condition based on the speed information of the moving vehicle 1000 and the surrounding road information of the moving vehicle 1000, and operate the adaptive driving beam (ADB) mode to automatically control the brightness of the lighting device 100 based on the speed of the moving vehicle 1000 in each condition.

FIG. 2 is a configuration diagram showing a variable lamp system for moving vehicles capable of adjusting brightness that includes a detection unit according to an embodiment of the present invention.

Referring to FIG. 2, a variable lamp system 10 for moving vehicles according to the present invention may further include a detection unit 300 in addition to the configuration described with reference to FIG. 1.

The detection unit 300 may directly detect speed information of the moving vehicle 1000 and surrounding road information of the moving vehicle 1000, and then transmit the information to the control unit 200. The detection unit 300 may include, for example, a speed sensor, an image sensor, a camera, a GPS, etc., but not limiting thereto.

The control unit 200 may receive, from the detection unit 300, the speed information of the moving vehicle 1000 and the surrounding road information of the moving vehicle 1000, and control the lighting device 100 based on the speed information of the moving vehicle 1000 and the surrounding road information of the moving vehicle 1000. The control unit 200 may control the brightness of the lighting device 100 by controlling the plurality of lamps 50 included in the lighting device 100.

In addition, the control unit 200 may store acceleration and deceleration information of the moving vehicle 1000, included in the speed information of the moving vehicle 1000, and identify a driver tendency based on the acceleration and deceleration information of the moving vehicle 1000. For example, the control unit 200 may classify the driver tendency as a first tendency (or a standard driver) if the following information are the same as each other by comparing pre-stored reference acceleration and deceleration information with the acceleration and deceleration information of the moving vehicle 1000 that is received from the moving vehicle 1000, classify the driver tendency as a second tendency (or a cautious driver) if the information of the moving vehicle 1000 has a large change from the pre-stored reference acceleration and deceleration information by comparing the pre-stored reference acceleration and deceleration information with the acceleration and deceleration information of the moving vehicle 1000, and classify the driver tendency as a third tendency (or a safe driver) if the information of the moving vehicle 1000 has a small change from the pre-stored reference acceleration and deceleration information by comparing the pre-stored reference acceleration and deceleration information with the acceleration and deceleration information of the moving vehicle 1000.

The control unit 200 may control the brightness of the lighting device 100 based on the speed information of the moving vehicle 1000, the surrounding road information of the moving vehicle 1000, and driver information corresponding to the first to third tendencies. The control unit 200 may operate an adaptive driving beam (ADB) mode to control the brightness of the lighting device 100 if a speed of the moving vehicle 1000 is a first critical speed (for example, 60 km/h or more) in a case where a road on which the moving vehicle 1000 travels is a highway (hereinafter, a first road) or a road that is brighter than a predetermined brightness standard (for example, a downtown area) (hereinafter, a second road), and the driver tendency is the second tendency.

In addition, the control unit 200 may operate the adaptive driving beam (ADB) mode to control the brightness of the lighting device 100 if the speed of the moving vehicle 1000 is a first critical speed (for example, 60 km/h or more) in a case where the road on which the moving vehicle 1000 travels is the first road and the driver tendency is the first tendency.

In addition, the control unit 200 may operate the adaptive driving beam (ADB) mode to control the brightness of the lighting device 100 if the speed of the moving vehicle 1000 is a second critical speed (for example, 40 km/h or more) in at least one of cases where the road on which the moving vehicle 1000 travels is the first road and the driver tendency is the second tendency, the road is the second road and the driver tendency is the first tendency, and the road is a road darker than the predetermined brightness standard (for example, a country road) (hereinafter, a third road), and the driver tendency is the third tendency.

In addition, the control unit 200 may operate the adaptive driving beam (ADB) mode to control the brightness of the lighting device 100 if the speed of the moving vehicle 1000 is the second critical speed (for example, 20 km/h or more) in at least one of cases where the road on which the moving vehicle 1000 travels is the second or third road and the driver tendency is the third tendency, or the road on which the moving vehicle 1000 travels is the third road and the driver tendency is the first tendency.

FIG. 3 is a configuration diagram showing a variable lamp system for moving vehicles capable of adjusting an irradiation angle according to an embodiment of the present invention.

Referring to FIG. 3, the variable lamp system 10 for moving vehicles according to an embodiment of the present invention may include the lighting device 100, a driving device 400, and the control unit 200. In addition, the variable lamp system 10 for moving vehicles may be connected to the moving vehicle 1000 in a wireless or wired manner, and receive, from the moving vehicle 1000, data such as speed information of the moving vehicle or surrounding road information of the moving vehicle.

The lighting device 100 may include at least one light emitting diode (LED) lamp 50. The number of LED lamps 50 included in the lighting device 100 may be determined by specifications of the lamp system 10 or specifications of the moving vehicle mounted with the lamp system 10. The lighting device 100 may control the radiated lighting brightness by turning on/off each of the plurality of LED lamps 50.

The driving device 400 may be connected to each of the lamps 50 included in the lighting device 100, or the lamps 50 included in the lighting device 100 may be all together connected to one driving device 400. The driving device 400 may have rotational power by including a motor or the like, and adjust the irradiation angle of the lighting device 100 by rotating the lamp 50 included in the lighting device 100.

The control unit 200 may receive the speed information of the moving vehicle 1000 and the surrounding road information of the moving vehicle 1000 from the moving vehicle 1000, and control the driving device 400 based on the speed information of the moving vehicle 1000 and the surrounding road information of the moving vehicle 1000. The control unit 200 may control the irradiation angle of the lighting device 100 by controlling the driving device 400.

In addition, the control unit 200 may store acceleration and deceleration information of the moving vehicle 1000, included in the speed information of the moving vehicle 1000, and identify a driver tendency based on the acceleration and deceleration information of the moving vehicle 1000. For example, the control unit 200 may classify the driver tendency as a first tendency (or a standard driver) if the following information are the same as each other by comparing pre-stored reference acceleration and deceleration information with the acceleration and deceleration information of the moving vehicle 1000 that is received from the moving vehicle 1000, classify the driver tendency as a second tendency (or a cautious driver) if the information of the moving vehicle 1000 has a large change from the pre-stored reference acceleration and deceleration information by comparing the pre-stored reference acceleration and deceleration information with the acceleration and deceleration information of the moving vehicle 1000, and classify the driver tendency as a third tendency (or a safe driver) if the information of the moving vehicle 1000 has a small change from the pre-stored reference acceleration and deceleration information by comparing the pre-stored reference acceleration and deceleration information with the acceleration and deceleration information of the moving vehicle 1000.

The control unit 200 may control the driving device 400 for the lighting device 100 to radiate lighting in a direction in which the moving vehicle 1000 is rotated based on the speed information of the moving vehicle 1000, the surrounding road information of the moving vehicle 1000, and driver information corresponding to the first to third tendencies. Here, the control unit 200 may perform three modes based on a rotation radius of the lighting device 100. The control unit 200 may perform a first mode when the rotation radius is the largest, a second mode when the rotation radius is a medium value, and a third mode when the rotation radius is the smallest. For example, the first mode may have a rotation radius of 30°, the second mode may have a rotation radius of 20°, and the third mode may have a rotation radius of 10°, and a size of the rotation radius for each mode may depend on the driving device 400, the lighting device 100, and other specifications.

The control unit 200 may control the driving device 400 in the first mode based on a speed limit for each road and a curvature of the road, included in the surrounding road information of the moving vehicle 1000, in a case where a road on which the moving vehicle 1000 travels is a highway (hereinafter, a first road), the curvature of the road is 710 R to 90 R, and the driver tendency is the first tendency. In addition, the control unit 200 may control the driving device 400 in the first mode even in a case where the road on which the moving vehicle 1000 travels is an automobile-only road (hereinafter, a second road), the curvature of the road is 380 R to 30 R, and the driver tendency is the first tendency. In addition, the control unit 200 may control the driving device 400 in the first mode even in a case where the road on which the moving vehicle 1000 travels is a general road (hereinafter, a third road), the curvature of the road is 140 R to 15 R, and the driver tendency is the second tendency.

In addition, the control unit 200 may control the driving device 400 in the second mode in a case where the road on which the moving vehicle 1000 travels is the first road, the curvature of the road is 710 R to 90 R, and the driver tendency is the third tendency. The control unit 200 may control the driving device 400 in the second mode even in a case where the road on which the moving vehicle 1000 travels is the second road, the curvature of the road is 380 R to 30 R, and the driver tendency is the second tendency. In addition, the control unit 200 may control the driving device 400 in the second mode even in a case where the road on which the moving vehicle 1000 travels is the third road, the curvature of the road is 140 R to 15 R, and the driver tendency is the first tendency.

In addition, the control unit 200 may control the driving device 400 in the third mode in a case where the road on which the moving vehicle 1000 travels is the first road, the curvature of the road is 710 R to 90 R, and the driver tendency is the second tendency. The control unit 200 may control the driving device 400 in the third mode even in a case where the road on which the moving vehicle 1000 travels is the second road, the curvature of the road is 380 R to 30 R, and the driver tendency is the third tendency. In addition, the control unit 200 may control the driving device 400 in the third mode even in a case where the road on which the moving vehicle 1000 travels is the third road, the curvature of the road is 140 R to 15 R, and the driver tendency is the third tendency.

FIG. 4 is a configuration diagram showing a variable lamp system for moving vehicles capable of adjusting an irradiation angle that includes the detection unit according to an embodiment of the present invention.

Referring to FIG. 4, the variable lamp system 10 for moving vehicles according to the present invention may further include the detection unit 300 in addition to the configuration described with reference to FIG. 3.

The detection unit 300 may directly detect speed information of the moving vehicle 1000 and surrounding road information of the moving vehicle 1000, and then transmit the information to the control unit 200.

The control unit 200 may receive, from the detection unit 300, the speed information of the moving vehicle 1000 and the surrounding road information of the moving vehicle 1000, and control the driving device 400 based on the speed information of the moving vehicle 1000 and the surrounding road information of the moving vehicle 1000. The control unit 200 may control the irradiation angle of the lighting device 100 by controlling the driving device 400.

In addition, the control unit 200 may store acceleration and deceleration information of the moving vehicle 1000, included in the speed information of the moving vehicle 1000, and identify a driver tendency based on the acceleration and deceleration information of the moving vehicle 1000. For example, the control unit 200 may classify the driver tendency as a first tendency (or a standard driver) if the following information are the same as each other by comparing pre-stored reference acceleration and deceleration information with the acceleration and deceleration information of the moving vehicle 1000 that is received from the moving vehicle 1000, classify the driver tendency as a second tendency (or a cautious driver) if the information of the moving vehicle 1000 has a large change from the pre-stored reference acceleration and deceleration information by comparing the pre-stored reference acceleration and deceleration information with the acceleration and deceleration information of the moving vehicle 1000, and classify the driver tendency as a third tendency (or a safe driver) if the information of the moving vehicle 1000 has a small change from the pre-stored reference acceleration and deceleration information by comparing the pre-stored reference acceleration and deceleration information with the acceleration and deceleration information of the moving vehicle 1000.

The control unit 200 may control the driving device 400 for the lighting device 100 to radiate lighting in a direction in which the moving vehicle 1000 is rotated based on the speed information of the moving vehicle 1000, the surrounding road information of the moving vehicle 1000, and driver information corresponding to the first to third tendencies. Here, the control unit 200 may perform three modes based on a rotation radius of the lighting device 100. The control unit 200 may perform a first mode when the rotation radius is the largest, a second mode when the rotation radius is a medium value, and a third mode when the rotation radius is the smallest. For example, the first mode may have a rotation radius of 30°, the second mode may have a rotation radius of 20°, and the third mode may have a rotation radius of 10°, and a size of the rotation radius for each mode may depend on the driving device 400, the lighting device 100, and other specifications.

The control unit 200 may control the driving device 400 in the first mode based on a speed limit for each road and a curvature of the road, included in the surrounding road information of the moving vehicle 1000, in a case where a road on which the moving vehicle 1000 travels is a first road, the curvature of the road is 710 R to 90 R, and the driver tendency is the first tendency. In addition, the control unit 200 may control the driving device 400 in the first mode even in a case where the road on which the moving vehicle 1000 travels is the second road, the curvature of the road is 380 R to 30 R, and the driver tendency is the first tendency. In addition, the control unit 200 may control the driving device 400 in the first mode in a case where the road on which the moving vehicle 1000 travels is the third road, the curvature of the road is 140 R to 15 R, and the driver tendency is the second tendency.

In addition, the control unit 200 may control the driving device 400 in the second mode in a case where the road on which the moving vehicle 1000 travels is the first road, the curvature of the road is 710 R to 90 R, and the driver tendency is the third tendency. The control unit 200 may control the driving device 400 in the second mode even in a case where the road on which the moving vehicle 1000 travels is the second road, the curvature of the road is 380 R to 30 R, and the driver tendency is the second tendency. In addition, the control unit 200 may control the driving device 400 in the second mode even in a case where the road on which the moving vehicle 1000 travels is the third road, the curvature of the road is 140 R to 15 R, and the driver tendency is the first tendency.

In addition, the control unit 200 may control the driving device 400 in the third mode in a case where the road on which the moving vehicle 1000 travels is the first road, the curvature of the road is 710 R to 90 R, and the driver tendency is the second tendency. The control unit 200 may control the driving device 400 in the third mode even in a case where the road on which the moving vehicle 1000 travels is the second road, the curvature of the road is 380 R to 30 R, and the driver tendency is the third tendency. In addition, the control unit 200 may control the driving device 400 in the third mode even in a case where the road on which the moving vehicle 1000 travels is the third road, the curvature of the road is 140 R to 15 R, and the driver tendency is the third tendency.

As set forth above, the present invention may flexibly control the irradiation angle of the lighting device based on the speed and surrounding environment of the moving vehicle.

In addition, the present invention may flexibly control the brightness of the lighting device based on the speed and surrounding environment of the moving vehicle.

In addition, the present invention may increase the driver's convenience by automatically activating the ADB function based on the driver's travel tendency.

In addition, the present invention may increase the driver's convenience by automatically adjusting the irradiation angle of the lighting device based on the travel tendency.

In addition, the present invention may improve the trade-off problem occurring between the visibility and the glare.

Although the embodiments of the present invention are described as above, the embodiments disclosed in the present invention are provided not to limit the spirit of the present invention but to fully describe the present invention. Therefore, the spirit of the present invention may include not only each disclosed embodiment but also a combination of the disclosed embodiments. Further, the scope of the present invention is not limited to these embodiments. In addition, it is apparent to those skilled in the art to which the present invention pertains that various variations and modifications could be made without departing from the spirit and scope of the appended claims, and all such appropriate variations and modifications should be considered as falling within the scope of the present invention as equivalents.

What is claimed is:

1. A variable lamp system for moving vehicles, which is variable based on a surrounding road state, the system comprising:

a lighting device including at least one lamp; and a control unit controlling the lighting device, wherein the control unit is configured to control brightness of the lighting device based on speed information of the moving vehicle and surrounding road information of the moving vehicle, and wherein the control unit is further configured to classify a driver tendency of acceleration and deceleration of the moving vehicle based on the speed information and to control the brightness of the lighting device based on the driver tendency.

2. The system of claim 1, wherein when a movement speed of the moving vehicle is classified into first, second, and third critical speeds, the first critical speed being greater than the second critical speed, and the second critical speed being greater than the third critical speed, the control unit is further configured to:

receive the speed information of the moving vehicle and the surrounding road information of the moving vehicle from the moving vehicle to control the brightness of the lighting device based on the speed information of the moving vehicle and the surrounding road information of the moving vehicle, classify the driver tendency as a first tendency in response to determining that acceleration and deceleration information of the moving vehicle, included in the speed information of the moving vehicle, is the same as pre-stored acceleration and deceleration information, classify the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classify the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and control the brightness of the lighting device based on the first to third tendencies and the first to third critical speeds.

3. The system of claim 2, wherein when a first road is a highway, and a second road is not the highway but a general road brighter than a predetermined brightness standard, the control unit is further configured to operate an adaptive driving beam (ADB) mode to control the brightness of the lighting device in response to determining that a speed of the moving vehicle is the first critical speed or more in a case where a road is the first road or the second road and the driver tendency is the second tendency, or the road is the first road and the driver tendency is the first tendency.

4. The system of claim 2, wherein when the first road is a highway, the second road is not the highway but a general road brighter than a predetermined brightness standard, and a third road is not the highway but a general road darker than the predetermined brightness standard, the control unit is further configured to operate an adaptive driving beam (ADB) mode to control the brightness of the lighting device in response to determining that a speed of the moving vehicle is the second critical speed or more in a case where the road is the first road and the driver tendency is the second tendency, the road is the second road and the driver tendency is the first tendency, or the road is the third road and the driver tendency is the third tendency.

5. The system of claim 2, wherein when the second road is not a highway but a general road brighter than a predetermined brightness standard, and a third road is not the highway but a general road darker than the predetermined brightness standard, the control unit is further configured to operate an adaptive driving beam (ADB) mode to control the brightness of the lighting device in response to determining that a speed of the moving vehicle is the third critical speed or more in a case where the road is the second road or the third road and the driver tendency is the third tendency, or the road is the third road and the driver tendency is the first tendency.

6. The system of claim 1, further comprising a detection unit providing the speed information of the moving vehicle and the surrounding road information of the moving vehicle, wherein the control unit is further configured to:

control the brightness of the lighting device based on the speed information of the moving vehicle and the surrounding road information of the moving vehicle, provided by the detection unit, classify the driver tendency as a first tendency in response to determining that acceleration and deceleration information of the moving vehicle, included in the speed information of the moving vehicle, is the same as pre-stored acceleration and deceleration information, classify the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classify the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and control the brightness of the lighting device based on the first to third tendencies.

7. The system of claim 6, wherein when a first road is a highway, and a second road is not the highway but a general road brighter than a predetermined brightness standard, the control unit is further configured to operate an adaptive driving beam (ADB) mode to control the brightness of the lighting device in response to determining that a speed of the moving vehicle that is detected by the detection unit is the first critical speed or more in a case where the road is the first road or the second road and the driver tendency is the second tendency, or the road is the first road and the driver tendency is the first tendency.

8. The system of claim 6, wherein when the first road is a highway, the second road is not the highway but a general road brighter than a predetermined brightness standard, and a third road is not the highway but a general road darker than the predetermined brightness standard, the control unit is further configured to operate an adaptive driving beam (ADB) mode to control the brightness of the lighting device in response to determining that a speed of the moving vehicle that is detected by the detection unit is the second critical speed or more in a case where the road is the first road and the driver tendency is the second tendency, the road is the second road and the driver tendency is the first tendency, or the road is the third road and the driver tendency is the third tendency.

9. The system of claim 6, wherein when the second road is not a highway but a general road brighter than a predetermined brightness standard, and a third road is not the highway but a general road darker than the predetermined brightness standard, the control unit is further configured to operate an adaptive driving beam (ADB) mode to control the brightness of the lighting device in response to determining that a speed of the moving vehicle that is detected by the detection unit is the third critical speed or more in a case where the road is the second road or the third road and the driver tendency is the third tendency, or the road is the third road and the driver tendency is the first tendency.

10. A variable lamp system for moving vehicles, which is variable based on a surrounding road state, the system comprising:

a lighting device including at least one lamp; and a driving device connected to the lamp to adjust an irradiation angle of the lighting device; and a control unit controlling the driving device, wherein the control unit is configured to control the driving device based on speed information of the moving vehicle and surrounding road information of the moving vehicle, and wherein the control unit is further configured to classify a driver tendency of acceleration and deceleration of the moving vehicle based on the speed information and to control the irradiation angle of the lighting device based on the driver tendency.

11. The system of claim 10, wherein the control unit is further configured to:

receive the speed information of the moving vehicle and the surrounding road information of the moving vehicle from the moving vehicle to control the driving device based on the speed information of the moving vehicle and the surrounding road information of the moving vehicle, classify the driver tendency as a first tendency in response to determining that acceleration and deceleration information of the moving vehicle, included in the speed information of the moving vehicle, is the same as pre-stored acceleration and deceleration information, classify the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classify the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and control the driving device based on the first to third tendencies.

12. The system of claim 11, wherein when first to third modes are classified based on the irradiation angle of the lighting device, a rotation radius of the lighting device in the first mode being larger than in the second mode, and a rotation radius of the lighting device in the second mode being larger than the third mode, the control unit is further configured to control the driving device in the first to third modes for the lighting device to radiate lighting in a rotation direction of the moving vehicle based on the speed information of the moving vehicle and the surrounding road information of the moving vehicle.

13. The system of claim 12, wherein when the surrounding road information of the moving vehicle includes first to third road information based on a speed limit of a road, a first road having a higher speed limit than a second road, and the second road having a higher speed limit than a third road, the control unit is further configured to control the driving device in the first mode in a case where:

the road is the first road and has a curvature of 710 radius R to 90 R, and the driver tendency is the first tendency, the road is the second road and has a curvature of 380 R to 30 R, and the driver tendency is the first tendency, or the road is the third road and has a curvature of 140 R to 15 R, and the driver tendency is the second tendency.

14. The system of claim 13, wherein the control unit is further configured to control the driving device in the second mode in a case where:

the road is the first road and has the curvature of 710 radius R to 90 R, and the driver tendency is the third tendency, the road is the second road and has the curvature of 380 R to 30 R, and the driver tendency is the second tendency, or the road is the third road and has the curvature of 140 R to 15 R, and the driver tendency is the first tendency.

15. The system of claim 13, wherein the control unit is further configured to control the driving device in the third mode in a case where:

the road is the first road and has the curvature of 710 radius R to 90 R, and the driver tendency is the second tendency, the road is the second road and has the curvature of 380 R to 30 R, and the driver tendency is the third tendency, or the road is the third road and has the curvature of 140 R to 15 R, and the driver tendency is the third tendency.

16. The system of claim 10, further comprising a detection unit providing the speed information of the moving vehicle and the surrounding road information of the moving vehicle, wherein the control unit is further configured to:

control the driving device based on the speed information of the moving vehicle and the surrounding road information of the moving vehicle, provided by the detection unit, classify the driver tendency as a first tendency in response to determining that acceleration and deceleration information of the moving vehicle, included in the speed information of the moving vehicle, is the same as pre-stored acceleration and deceleration information, classify the driver tendency as a second tendency in response to determining that the acceleration and deceleration information of the moving vehicle has a large change from the pre-stored acceleration and deceleration information by comparing the acceleration and deceleration information of the moving vehicle with the pre-stored acceleration and deceleration information, classify the driver tendency as a third tendency in response to determining that the acceleration and deceleration information of the moving vehicle has a small change from the pre-stored acceleration and deceleration information by comparing the acceleration and deceleration information of the moving vehicle with the pre-stored acceleration and deceleration information, and control the driving device based on the first to third tendencies.

17. The system of claim 16, wherein when the surrounding road information of the moving vehicle includes first to third road information based on a speed limit of a road, a first road having a higher speed limit than a second road, and the second road having a higher speed limit than a third road, and first to third modes are classified based on the irradiation angle of the lighting device, a rotation radius of the lighting device in the first mode being larger than in the second mode, and a rotation radius of the lighting device in the second mode being larger than the third mode, the control unit is further configured to control the driving device in the first mode in a case where:

the road is the first road and has a curvature of 710 radius R to 90 R, and the driver tendency is the first tendency, the road is the second road and has a curvature of 380 R to 30 R, and the driver tendency is the first tendency, or the road is the third road and has a curvature of 140 R to 15 R, and the driver tendency is the second tendency.

18. The system of claim 17, wherein the control unit is further configured to control the driving device in the second mode in a case where:

the road is the first road and has the curvature of 710 radius R to 90 R, and the driver tendency is the third tendency, the road is the second road and has the curvature of 380 R to 30 R, and the driver tendency is the second tendency, or the road is the third road and has the curvature of 140 R to 15 R, and the driver tendency is the first tendency.

19. The system of claim 17, wherein the control unit is further configured to control the driving device in the third mode in a case where:

the road is the first road and has the curvature of 710 radius R to 90 R, and the driver tendency is the second tendency, the road is the second road and has the curvature of 380 R to 30 R, and the driver tendency is the third tendency, or the road is the third road and has the curvature of 140 R to 15 R, and the driver tendency is the third tendency.

* * * * *